US006361696B1

United States Patent
Spiegelman et al.

(10) Patent No.: US 6,361,696 B1
(45) Date of Patent: Mar. 26, 2002

(54) SELF-REGENERATIVE PROCESS FOR CONTAMINANT REMOVAL FROM LIQUID AND SUPERCRITICAL CO2 FLUID STREAMS

(75) Inventors: Jeffrey J. Spiegelman, La Jolla; Daniel Alvarez, Jr., San Diego; Peter K. Shogren, San Diego; Joshua T. Cook, San Diego, all of CA (US)

(73) Assignee: Aeronex, Inc., San Diego, CA (US)

( * ) Notice: Subject to any disclaimer, the term of this patent is extended or adjusted under 35 U.S.C. 154(b) by 0 days.

(21) Appl. No.: 09/487,637

(22) Filed: Jan. 19, 2000

(51) Int. Cl.$^7$ ............................................. B01D 15/04
(52) U.S. Cl. ............................. 210/662; 95/8; 95/143; 210/677; 210/690
(58) Field of Search .................. 95/8, 12, 116–118, 95/119, 135–137, 141–143; 210/670, 662, 677, 690

(56) References Cited

U.S. PATENT DOCUMENTS

| | | | | |
|---|---|---|---|---|
| 4,021,211 A | * | 5/1977 | Turek et al. ................. | 55/18 |
| 5,405,431 A | * | 4/1995 | Eastman ........................ | 95/11 |
| 5,557,030 A | * | 9/1996 | Markovs et al. ............. | 585/826 |
| 5,580,461 A | * | 12/1996 | Cairns et al. ................ | 210/673 |
| 5,599,381 A | * | 2/1997 | Whitlock ....................... | 95/90 |
| 5,676,737 A | * | 10/1997 | Whitlocki ..................... | 95/90 |
| 5,858,068 A | * | 1/1999 | Lansbarkis et al. .......... | 95/116 |
| 5,910,292 A | * | 6/1999 | Alvarez et al. .............. | 423/210 |
| 6,099,619 A | * | 8/2000 | Lansbarkis et al. .......... | 95/118 |

OTHER PUBLICATIONS

Kasi et al., "Vapor phase hydrocarbon removal for Si processing," *Appl. Phys. Lett.*, 57(20):2095–2097, 1990.
Rubin et al., "Carbon Dioxide–Based Supercritical Fluids and IC Manufacturing Solvents," *1999 IEEE Intl. Symp. On Electron. And Environ.*, 13–20, 1998.
Sherman et al., "The removal of hydrocarbons and silicone grease stains from silicon wafers," *J. Vac. Sci. Tech. B.*, 8(3):563–567, 1990.
Sherman et al., "Dry surface cleaning using $CO_2$ snow," *J. Vac. Sci. Tech. B.*, 8(3)1970–1977, 1991.

* cited by examiner

*Primary Examiner*—Peter A. Hruskoci
(74) *Attorney, Agent, or Firm*—Brown, Martin, Haller & McClain

(57) ABSTRACT

A method for the decontamination of fluid (liquid or supercritical) carbon dioxide fluid, especially of hydrocarbon contaminants, down to ≦100 ppb concentration are described. The critical component is a high silica zeolite, preferably a high silica Y-type zeolite, ZSM-5 or a high silica mordenite, which in a variety of physical forms is capable of decontaminating such fluid $CO_2$ to ≦100 ppb, ≦10–50 ppb, or ~1 ppb, without being detrimentally affected by the supercritical operating environment. The high silica zeolite may be produced by the removal of alumina from a natural or synthetic zeolite while retaining the desirable zeolite structure, to a silica:alumina ratio of from 20–2000:1. Preferably the zeolite is disposed in separate quantities in at least two vessels, which operate alternately. A portion of the purified product from the operating vessel is directed to the other vessel and there used to remove accumulated contaminants from that vessel's zeolite. The process thus provides self-regeneration, in that regeneration of one vessel occurs while the other vessel decontaminates contaminated fluid carbon dioxide, so that use of the two can be alternated for substantially continual production of purified fluid carbon dioxide. The invention provides purified fluid carbon dioxide used in manufacture of such products as high purity electronic, optical, prosthetic or similar products or polymers or pharmaceuticals or in beverages.

32 Claims, 3 Drawing Sheets

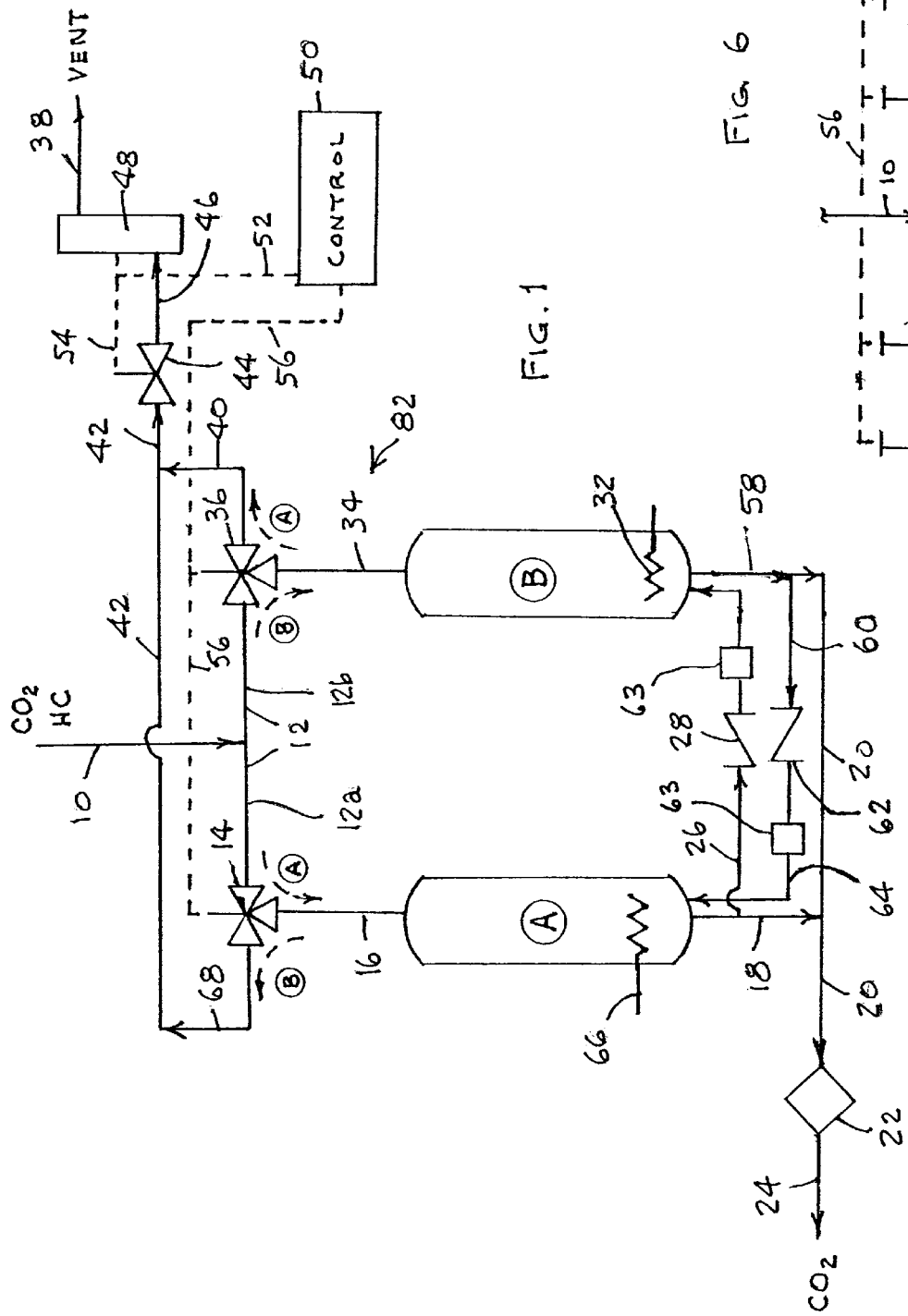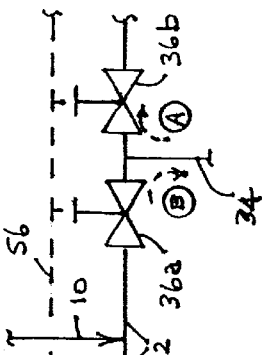

SELF-REGENERATIVE PROCESS FOR CONTAMINANT REMOVAL FROM LIQUID AND SUPERCRITICAL $CO_2$ FLUID STREAMS

BACKGROUND OF THE INVENTION

1. Field of the Invention

The invention herein relates to the removal of contaminants from fluid streams. More particularly it relates to the production of substantially contaminant free supercritical and liquid carbon dioxide ($CO_2$) fluid streams.

2. Description of the Prior Art

A supercritical fluid is a fluid which is in a state above its critical temperature and critical pressure where gas and liquid phases resolve into a single medium, in which density can vary widely without a phase transition. This allows, for instance, substances which normally act as solvents primarily for inorganic or polar substances to also become efficient solvents for organic or nonpolar materials. Because of these unique properties, supercritical fluids are used in a wide variety of industries, particularly for solvent extraction; examples include polymer and pharmaceutical manufacturing, food processing, environmental processes and precision cleaning in manufacture of products where high purity and cleanliness is required, such as semiconductor manufacturing, including removal or organic photoresist materials. For the most part, achieving supercriticality requires rasing gaseous or liquid compounds to quite high temperatures and pressures.

In contrast, a compound which finds numerous uses in its supercritical state is carbon dioxide, which reaches supercritical state under moderate conditions at a critical point (CP) of 31.3° C. (88.3° F.) and 74 bar (1070 psi). The supercritical region for carbon dioxide is shown in the upper right hand portion of the P/T graph of FIG. 7. Another fluid phase, liquid carbon dioxide, exists at temperatures in the range shown substantially in the center of the P/T graph of FIG. 7. Essentially the liquid region is bounded by the supercritical region above 31.3° C. (88.3° F.) and 74 bar (1070 psi), the pressure/temperature curve between the liquid and gaseous phase regions defining distillation Of $CO_2$, running from the triple point (TP) at −56.6° C. (−69.9° F.) and 5.2 bar (75.1 psi) to the critical point, and the liquid/solid curve defining solidification and running from the triple point at substantially constant temperature and increasing pressures. Carbon dioxide is therefore liquid at moderate pressures and temperatures (including "room temperature" of 25° C. [77° F.] and about 68 bar [985 psi]).

For brevity herein the term "fluid carbon dioxide" or "fluid $CO_2$," will be used as the comprehensive term to refer to both liquid and supercritical carbon dioxide, where the text discusses information applicable to both. Where one or the other phase is expressly intended, it will be so identified. Further, supercritical carbon dioxide will also sometimes be referred to as "SC $CO_2$".

In the manufacture of semiconductors and wafers, it is critical that at each stage of manufacture the materials be extremely clean. The presence of any significant amount of contamination will usually render the final product unusable. Manufacturing specifications therefore commonly require that concentrations of contaminants in each stage of manufacturing be maintained in the sub-ppb (parts per billion) range. A common class of contaminant in the manufacture of semiconductors and wafers is hydrocarbons, which occur as residues from use of hydrocarbon solvents earlier in the manufacturing process, from hydrocarbon skin oils left by workers handling the materials, from lubricants used in the compressors and pumps which move the high pressure gases through the production chambers, and from lubricants used on other manufacturing equipment.

Fluid carbon dioxide, especially SC $CO_2$, has been found to be particularly useful for cleaning of semiconductors and wafers, where it is used in the form of "snow" or solid carbon dioxide flakes. The snow is formed when the fluid carbon dioxide is "flashed" or sprayed at high flow rate from nozzles into the cleaning chamber. In one mode of decontamination, the carbon dioxide flakes traveling at high speed impact against the contaminants on the surface of the semiconductor or wafer and cause the contaminants to be ejected into the moving carbon dioxide gas stream. In another mode the fluid carbon dioxide absorbs the contaminants from the semiconductor or wafer surface, in a manner akin to solvent extraction. The solid carbon dioxide snow then sublimes into the gas stream and is carried away for an environmentally safe recovery.

Of course for this cleaning system to work effectively the fluid carbon dioxide itself must be contaminant free. While there have been prior systems to decontaminate carbon dioxide, such prior art systems (such as distillation and cryogenic processes) have all been cumbersome, time-consuming and of limited effectiveness. Further, many processes focus on decontaminating the carbon dioxide as a gas prior to its being raised to liquid or supercritical conditions. This creates a potential for recontamination during the conversion to the fluid state, since oils and lubricants used in the compressors and pumps used to achieve the liquid and supercritical pressures often contaminate the $CO_2$ as it is being compressed. To make fluid carbon dioxide cleaning as efficient as possible, it is important to reduce contaminants in the fluid carbon dioxide itself, and, consistent with the other specified system contaminant levels, particularly to reduce them to a ppb level. Prior art systems to have been unable to reach this level with fluid carbon dioxide on a consistent basis or in an economically viable manner.

Many processes exist to decontaminate gases by passing them through beds of conventional zeolites, silica, alumina and other oxides, metals, etc. Commercial products produced by the assignee of this patent application, Aeronex, Inc., of San Diego, Calif., have incorporated high silica content zeolites for the removal of water from corrosive gas streams; patents have been applied for for such products and the decontamination methods they employ. None of these prior art systems, however, has been used to decontaminate a gaseous compound while it is in its liquid or supercritical state.

In addition to the Aeronex product and method mentioned above, zeolites have also been used in other contaminant removal processes, but primarily as carriers or substrates for various impregnated metal getters or dehydrating or decontaminating catalysts. In this regard they have merely been substitutes for conventional silica, alumina and carbon substrates.

Further, none of the prior art processes has had the ability to decontaminate fluid $CO_2$ on a continuous basis. To accomplish that, one must have the ability to regenerate some of the decontaminant capacity while operating the remaining capacity for decontamination. A process for continuous removal of water and $CO_2$ from specialty gases in a two-vessel system is shown in U.S. Pat. No. 5,833,738, but that process is not self-regenerating, since it uses nitrogen from a source outside the system for the regeneration, and passes purified gas from the purification vessel to the regeneration vessel only for a short initial period to equilibrate the vessels.

SUMMARY OF THE INVENTION

We have now developed a unique and highly effective process for the removal of contaminants from fluid (liquid and supercritical) carbon dioxide down to essentially a 1 ppb concentration. Intermediate levels which can readily be reached are 100 ppb and 10 ppb. This decontamination process can be operated for long periods of time, since the critical material used is not susceptible to degradation in the carbon dioxide liquid phase and supercritical phase temperature and pressure regimes. The process also provides for self-regeneration of the deactivated bed of one vessel with purified gas from the operating bed of the other vessel. This permits continual production of purified fluid $CO_2$ from the process, by alternating use of the vessels with the zeolite bed of one vessel decontaminating the fluid $CO_2$ while the zeolite bed of the other vessel is being regenerated.

We have discovered that high silica zeolites, particularly high silica mordenite and its analogs, can be used very effectively as catalysts to reduce the contaminant level in fluid carbon dioxide to 100 ppb or lower, and in many cases down to at least 50 ppb, 10 ppb and in some cases to about 1 ppb. The high silica zeolites are preferable used as a porous bulk material, but can be in the form of coating on a substrate.

The hydrocarbons and water which are the main contaminants in the incoming fluid $CO_2$ are absorbed in the zeolite bed, resulting in a product stream of purified fluid $CO_2$. This product stream may be the initial input stream to the process utilizing the fluid $CO_2$ for cleaning, or it may be a recycle stream being returned to the cleaning process for reuse after the fluid $CO_2$ has been purified. In the first case, the feed stream to the purification system will be a stream of fresh (but not decontaminated) fluid $CO_2$, while in the second case the feed stream will be the outlet product of the cleaning process, i.e., the fluid $CO_2$ cleaner stream contaminated with the materials picked up during the cleaning process.

The principal contaminants which are removed from the fluid carbon dioxide are various hydrocarbons, which may have been absorbed by the carbon dioxide from a number of different sources (the specific sources not being significant for the purposes of this invention), because of the affinity for absorption of hydrocarbons by carbon dioxide. Their removal is important for two reasons. First, since the fluid carbon dioxide (whether as fresh feed or recycle) will be used in the precision cleaning process to remove contaminants, many of which will be hydrocarbons, its removal efficiency is enhanced if its initial hydrocarbon contaminant content is minimal. Second, when the fluid carbon dioxide is flashed to form the cleaning snow, hydrocarbon contaminants will be separated from the carbon dioxide and can deposit as contaminants on the semiconductor or wafer which is to be cleaned.

Zeolites are a class of synthetic and natural minerals having an aluminosilicate tetrahedral framework, ion-exchangable large cations, and 10%–20% loosely held water molecules which permit reversible dehydration without significant alteration in the molecular structure. They are often referred to as "molecular sieves" because of their ability to separate gaseous and liquid molecules on the basis of molecular size. The metal cations present are primarily sodium and calcium, but may also include various alkali metal or alkaline elements such as potassium, strontium and barium. To be suitable for the present invention, the zeolites must have the water removed and also the alumina content must be reduce to a point where the silica is the predominant component of the zeolite structure. Particularly preferred in this invention is a high silica mordenite.

In the preferred "high silica" zeolite structure of the present invention, the $SiO_2:Al_2O_3$ ratio of the zeolite will be at least 20:1, preferably will be at least 90:1, and more preferably will be at least 300:1 or higher. (Ratios of 500:1, 2000:1 and higher would be even better, and while there are not currently any commercial zeolites which have that high a ratio, their use in this invention is contemplated when they become available.) It is believed that the critical aspect which determines suitability of a particular zeolite for the present invention is the ability to undergo alumina removal without significant alteration in the zeolite structure or metal cation content, so that the large pore size (4 Å–20 Å) remains after the alumina is removed. For instance, with the preferred material, silica mordenite, the mordenite structure (whether natural or synthetic) is considered to be quite suitable for decontamination of a supercritical carbon dioxide stream, because it is a good adsorbent and also because of its structural stability in the flowing gas stream, so that the pores do not collapse under pressure.

While we do not wish to be bound by any specification of a mechanism, it is believed that the system operates because the hydrocarbons and other contaminants preferentially bind to the hydrophilic active sites within the zeolite pores, blocking the carbon dioxide from binding so that it passes though to be used in the thus-purified state.

Therefore, in one broad embodiment, the invention is of a method for removing contaminants from a stream of fluid carbon dioxide which comprises contacting the fluid carbon dioxide with a quantity of high silica zeolite for a period of time sufficient to reduce the contaminant content of the fluid carbon dioxide stream to not more than 100 ppb, preferably to not more than 10–50 ppb, and more preferably to not more than about 1 ppb.

The invention also includes operating the method in a manner which allows the system to be self-regenerating. This comprises dividing the zeolite into at least two beds (normally of essentially equal capacity) each placed in its own reaction vessel, operating one bed to decontaminate the contaminated fluid carbon dioxide and simultaneously regenerating the other zeolite bed using a portion of the purified fluid carbon dioxide product from the operating bed. The draw-off stream of the purified fluid $CO_2$ product regenerates the zeolite bed by removing the contaminants which accumulated on the zeolite during the bed's previous decontamination operation. The regeneration rate is controlled such that the bed is fully regenerated several hours or days before the other bed's decontamination capacity is reached, so that when the other bed approaches its capacity for adequately decontaminating the contaminated fluid $CO_2$, the contaminated $CO_2$ fluid stream can (within a period of a few seconds) be diverted to the regenerated bed and the decontamination of the fluid $CO_2$ can proceed substantially without interruption. A draw-off stream of a portion of the purified fluid $CO_2$ is passed from the newly decontaminating bed and passed to the other vessel so that the bed whose capacity was reached can be regenerated. By thus alternating operating and regenerating zeolite beds, virtually continuous production of purified fluid carbon dioxide can be achieved and maintained for extended periods of time, generally measured in months and years.

Thus, in another broad embodiment, the invention is of a method for removing contaminants from a stream of fluid carbon dioxide which comprises contacting the fluid carbon dioxide with a quantity of high silica zeolite for a period of time sufficient to reduce the contaminant content of the $CO_2$ fluid stream to not more than 100 ppb, preferably to not more than 10–50 ppb, and more preferably to not more than about 1 ppb, in which the high silica zeolite is disposed in at least two separate quantities within a corresponding number of vessels, the vessels being interconnected such that contaminated fluid carbon dioxide may be directed to one of the vessels for decontamination, with a portion of decontaminated fluid carbon dioxide exiting from that vessel being passed to a second vessel and used to remove accumulated fluid carbon dioxide contaminants from zeolite within the second vessel, such that the zeolite within the second vessel may subsequently be used to decontaminate additional contaminated fluid carbon dioxide.

Also as part of this embodiment are the steps, upon cessation of decontamination in the first vessel and of removal of contaminates from the zeolite in the second vessel, of diverting contaminated fluid carbon dioxide to the second vessel and passing a portion of the purified fluid carbon dioxide product therefrom to the first vessel to remove accumulated contaminants from zeolite therein and thus rejuvenate the first zeolite bed. The repeated alternation of decontaminating and regenerating beds thus permits the decontamination process to continue for extended periods, with no need to provide regeneration from any source outside the system.

BRIEF DESCRIPTION OF THE DRAWINGS

FIG. 1 is a schematic diagram of a fluid $CO_2$ decontamination system utilizing the method of this invention.

FIG. 6 is a schematic detail diagram of an alternative valving system for the system of FIG. 1.

Figure 2:
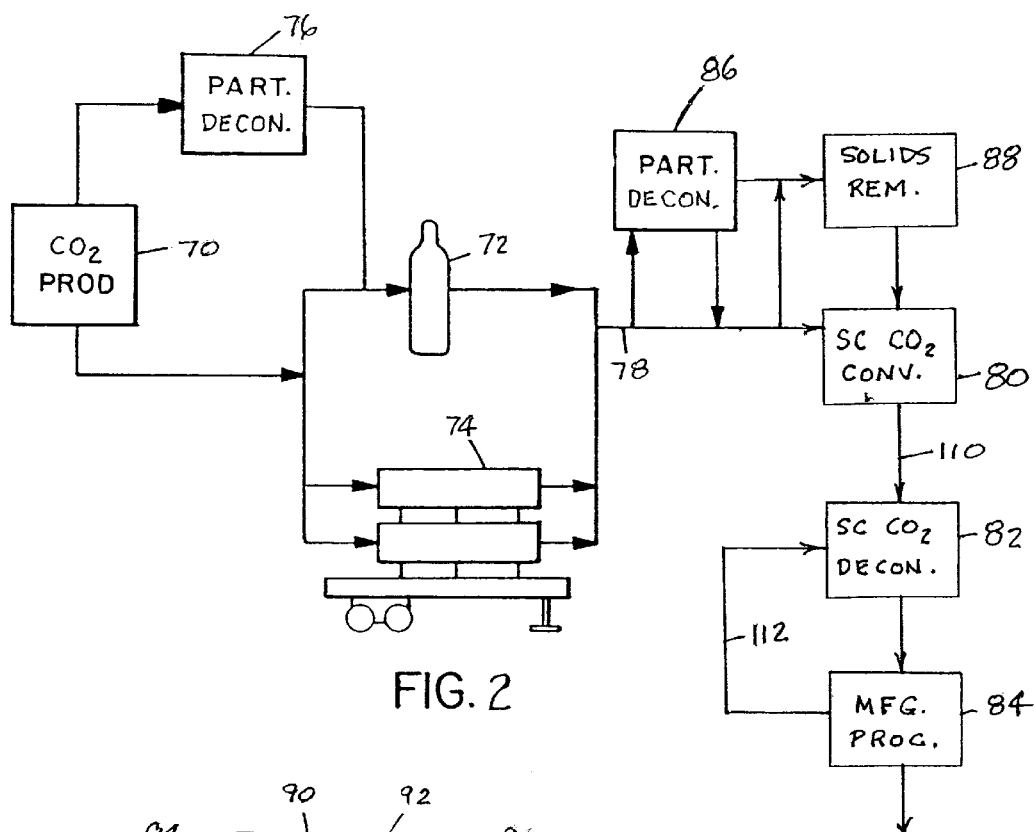
FIG. 2 is a block diagram illustrating the use of the present fluid $CO_2$ decontamination method as part of a manufacturing operation in which the purified fluid $CO_2$ is used for precision cleaning in a high purity manufacturing process.

[1] This diagram is drawn only to approximate scale. For exact data, reference should be made to any illustration of the carbon dioxide phase diagram in the technical literature.

DETAILED DESCRIPTION AND PREFERRED EMBODIMENTS

A critical aspect of the present invention is the use of a high silica zeolite as the decontaminating agent for removal of contaminants, especially hydrocarbons, from fluid carbon dioxide, down to the 100 ppb concentration level or lower for extended periods of time without itself being degraded by the elevated temperature and pressure environment necessary to maintain the carbon dioxide in its fluid state.

It will be recognized in considering this invention that "effectiveness" for the purpose of the invention means the ability to remove sufficient contaminants from the fluid carbon dioxide stream that the residual contaminant content of the treated fluid after contact with the high silica zeolite in the decontaminating device is no more than 100 ppb, preferably no more than 50 or 10 ppb, and most preferred, no more than about 1 ppb. While prior art has taught the use of oxides or metals for various "purification" or "decontamination" processes, those systems were not operated under liquid or supercritical phase conditions. Therefore they did not examine the decontamination of liquid or supercritical fluids, particularly carbon dioxide, and therefore did not suggest or identify the unique nature of the specific type of high silica zeolites which we have discovered as critical to the exceptional functioning of the present invention. Thus, with respect to the present invention, a material's mere ability to decontaminate gaseous carbon dioxide to a desired level is not sufficient for guaranteeing that it will be useful; the material must also be sufficiently resistant to the fluid and supercriticality environments or regimes that it can be used for extended service periods of at least 24 months of maintaining 100 ppb hydrocarbon content (or less, usually significantly less) in the exit fluid carbon dioxide. Our invention resides in the discovery that the high silica zeolites are unique in this respect.

The zeolites are a well known and widely described class of natural and synthetic aluminosilicates. For the purposes of this invention, the term "zeolite" will mean any aluminosilicate, natural or synthetic, which has a crystalline structure substantially equivalent to that of the minerals classified as zeolites. The natural zeolites have been widely described in standard mineralogy texts for many years; particularly good descriptions are found in Dana, A Textbook of Mineralogy, pp. 640–576 (4th ed. [rev'd. by Ford]: 1932); Deer et al., An Introduction to the Rock Forming Minerals, pp. 393–402 (1966) and Kühl et al., "Molecular Sieves," in Ruthven, ed., Encyclopedia of Separation Technology, vol. 2, pp. 1339–1369 (1997). The synthetic zeolites, which have been developed primarily for use in chemical and petroleum catalytic processes, are often referred to by the prefix word "synthetic" attached to the name of their natural counterparts, or, for those synthetic zeolites which do not have natural counterparts, by various coined names, such as Zeolite A, Zeolite X, Zeolite Y, ZSM-5, and so forth. An excellent description of the synthetic zeolites and their manufacture and uses as catalysts will be found in the Kühl et al. reference cited above.

Zeolites, both natural and synthetic, have the general formula and structure of $(M,M').mAl_2O_3.nSiO_2.xH_2O$ where M and M' are each usually sodium, potassium, calcium or barium, but may also be strontium, or, rarely, magnesium, iron or other metal cations. The less common cations are found more often in the synthetic zeolites, where they have usually been incorporated for specific catalytic purposes. The coefficients m, n and x will vary according to the specific zeolite considered. The grouping of zeolite "families" is usually based on associating structures having similar ratios of alumina:silica:water. For instance, mordenites normally have $Al_2O_3:SiO_2:H_2O$ ratios of approximately 1:9–10:6–7, heulandites of approximately 1:6–9:5–6 and phillipsites of approximately 1:2:2. Numerous others are illustrated in the above-mentioned references. In the present invention the more preferred structures are those of ZSM-5, the high-silica Y-type zeolites and the mordenite family, particularly mordenite itself. Mordenite is variously described for the natural mineral as (Ca,Na)

.$Al_2O_3 \cdot 9SiO_2 \cdot 6H_2O$ by Dana, supra, and as $(Na_2,K_2,Ca) \cdot (Al_2Si_{10}O_{24}) \cdot 7H_2O$ by Deer et al., supra. Analogous members of the mordenite family are ptilolite, flokite, ferrierite and dachiardite among the natural zeolites and a synthetic zeolite known commercially as "Zeolon."

For the purposes of the present invention, however, the conventional natural and synthetic zeolites, including the mordenites, are not sufficiently active toward contaminant removal in the liquid or supercriticality environment to be useful as decontaminating agents for fluid carbon dioxide. However, we have discovered that if the alumina content of the zeolite is substantially reduced, producing a predominately silica, zeolite, and the metal cation content is substantially reduced, the resulting material, which we will refer to herein as a "high silica zeolite," has superior adsorption properties in the liquid or supercriticality environment. Because of this superior activity and the retention of the zeolite structure, the resulting high silica zeolites are excellent decontaminating agents for fluid carbon dioxide for precision cleaning in high purity product manufacturing processes. Of the high silica zeolites, the high silica mordenites are particularly preferred. Again while not wishing to be bound to any particular theory of adsorption mechanism, we believe that the high silica structures of ZSM-5, the Y-type zeolites and the high silica mordenites are particularly suited to adsorption of contaminants, especially hydrocarbons, from the fluid stream. For brevity herein, the adsorption agents of the present invention will often be referred to collectively as an exemplary high silica mordenite; it will be understood, however, that the descriptions are applicable to all of the useful high silica zeolites, The high silica zeolites useful in this invention will have a silica:alumina ratio of at least 20:1, preferably at least 90:1, and more preferably at least 300:1. A preferred range is 500–1000:1, although high silica zeolites with ratios as high as 2000:1 have been prepared and it is anticipated that the higher ratios will be preferred in specific applications. Their use is therefore contemplated in this invention when they become commercially available. Surface areas of the high silica zeolites are typically up to about 1000 $m^2/gm$, preferably in the range of 800–1000 $m^2/gm$. Normally the high silica zeolites are prepared by treating the original natural or synthetic zeolite with a reactant specific to alumina, so that the alumina content is substantially reduced without affecting the silica content or significantly altering the zeolite structure. Again while not wishing to be bound to any particular theory of the mechanism of supercritical regime decontamination functionality, we believe one reason for the superior performance in the liquid and supercriticality environment of the high silica zeolites is the relative rates of adsorption by silica versus alumina under such conditions.

For most of the high silica zeolites, including the preferred high silica mordenite, it is preferred to activate the material prior to incorporation into the fluid system for decontamination. Activation can be accomplished by heating the high silica zeolite in an anhydrous inert gas atmosphere (e.g., $N_2$ or Ar gas) at a temperature of about 150°–425° C. (300°–800° F.) for about 24–72 hours. Alternatively liquid or supercritical $CO_2$ can also function as an activating agent. The activating agent or gas itself must be dehydrated prior to the activation procedure.

Another key feature of the method of the present invention is operation of the decontamination system such that it is self-regenerating. This is best understood by reference to FIG. 1. In this figure the fluid $CO_2$ with its contaminants such as hydrocarbons, is passed to the decontamination system through line 10. It passes into line 12 through which can be passed alternatively to either reaction vessel A or B. (For the following description it will be assumed that initially reactor A is the decontamination reactor and reactor B is the reactor which is undergoing regeneration). In this operating mode the contaminated fluid carbon dioxide is passed through line 12a to three-way valve 14 through which it is diverted to line 16 leading to reactor A, as indicated by the dashed arrow marked with the circled A. In reactor A the contaminated carbon dioxide is decontaminated by passage through the zeolite bed, as will be described below. Most of the decontaminated (purified) fluid $CO_2$ leaves reactor A through discharge line 18 from which it is passed through discharge line 20 and filter 22 and sent on through line 24 to the manufacturing process in which it will be used for cleaning, as will be described later.

A small portion of the purified fluid $CO_2$ is withdrawn from discharge line 18 through line 26 and passed through one-way valve 28 and line 30 to reactor B. A small vaporizing unit 63 is used to convert the fluid $CO_2$ to gaseous $CO_2$ for use in the regenerating reactor B. The zeolite bed in reactor B will be contaminated with those materials, such as hydrocarbons, which it has removed from the fluid $CO_2$ in a previous decontamination operation. As purified gaseous $CO_2$ drawn off from reactor A passes upward through the zeolite bed in reactor B, which is heated to the appropriate temperature by heating element 32, the $CO_2$ absorbs the contaminants or physically entrains them in the moving gas stream. It will be recognized that it is not necessary to maintain fluid or supercriticality conditions of temperature and pressure in the regenerating vessel, and that gaseous phase conditions are sufficient, since the carbon dioxide exiting from the regenerating reactor is not to be reused but is to be vented. After passage of the gaseous $CO_2$ through the entire zeolite bed, the gas stream with its entrained or absorbed materials exits at the top of the reactor through line 34 and passes through three-way valve 36, which is aligned to direct the gas stream to vent 38 as indicated by the second dashed arrow labeled with the circled A. The discharged contaminated $CO_2$ passes through line 40 into discharge line 42 and through control valve 44 to line 46 and metering device 48. Metering device 48 is preferably a rotameter or a mass flow controller and the flow rate obtained through the rotameter is passed to control system 50 through signal line 52. The control system 50 then operates valve 44 through signal lines 52 and 54 to control the off-gas flow rate from reactor B so that passage of the regenerating $CO_2$ through reactor B will be at a rate sufficient to completely regenerate the zeolite bed in reactor B during a time interval less than the time interval used by reactor A for decontamination of contaminated supercritical $CO_2$, preferably by several hours up to several days. This ensures that when the decontamination capacity of the zeolite bed in reactor A is approached or reached, control device 50 can operate three-way valves 14 and 36 through signal line 56 to redirect the incoming contaminated fluid $CO_2$ through line 12b to reactor B for decontamination in reactor B while then taking reactor A out of decontamination service for regeneration of its zeolite bed.

An alternate valving system for reactors A and B is illustrated in FIG. 6. Instead of three-way valves 14 and 36, in this embodiments pairs of ball valves 14a/14b and 36a/36b are used to route the carbon dioxide streams. These valves can be opened gradually and simultaneously closed, to provide for the same operating flow streams as described above.

Control system 50 may be a simple electrical system with timers controlling the signals to switch valves 14 and 36 (or 14a/14b and 36a/36b) and a circuit responsive to metering device 48 to adjust control valve 44 as appropriate, or it may be a microprocessor, with the control of valves 14, 36 (14a/14b, 36a/36b) and 44 being managed by software. Such systems are conventional and need not be described further here. Regardless of which type of system is used, it will also contain appropriate safety features, such as a limiting function to turn off a heating element 32 or 66 if an operating or regenerating vessel A or B becomes overheated. Other features which can be included in the control system 50 for functions such as safety, operator information, or convenience, can also be included as desired.

Regeneration of the zeolite bed in reactor A proceeds in the same manner as described above for reactor B. Three-way valve 36 is aligned as indicated by the dashed arrow marked with the circled B for passage of the stream of contaminated $CO_2$ into reactor B. The main quantity of purified product fluid $CO_2$ is discharged from reactor B through line 58 and passes to discharge line 20. A small portion of the purified $CO_2$ product is withdrawn from line 58 through line 60 and passed through one-way valve 62 and line 64 to reactor A. Reactor A is heated to the proper temperature for zeolite decontamination by heating element 66. The purified $CO_2$ gas passes through reactor A and removes the accumulated contaminants from the zeolite bed in the vessel, after which it is discharged at the top of the vessel through line 16 and three-way valve 14, which is now oriented as indicated by the second dashed arrow labeled with the circled B. The contaminated gas passes into line 68 from which it passes to line 42 for eventual venting as described previously.

It has been found that a typical zeolite bed can be operated for approximately 5–60 days for decontamination of contaminated fluid $CO_2$ before the decontamination rate is reduced to an unacceptable level, depending on the grade of $CO_2$ being used. Similarly, it has been found that regeneration of a spent zeolite bed using a relatively small draw-off stream (approximately 2%–5% of the purified product) from the operating reactor can regenerate a zeolite bed in approximately 36 hours. Consequently it is easy to operate the present system such that the two reactors are alternated as the decontamination and regeneration reactors at regular intervals. The operator is thus assured that there is a virtually continuous flow of purified fluid $CO_2$ from the operating reactor and that switching of the contaminated $CO_2$ fluid stream is accomplished before the zeolite bed in the decontamination reactor is completely spent. Since the three-way valves 14 and 36 (or ball valves 14a/14b and 36a/36b) normally operate to switch the incoming fluid stream between lines 12a and 12b within about 10–15 seconds, there is essentially no significant lapse in production of purified fluid $CO_2$ from the system.

Because zeolites retain their efficacy for purification of contaminated fluid $CO_2$ over extended periods of time when they are regularly stripped of contaminants and regenerated, the system shown in FIG. 1 of this invention can be used to produce purified liquid and supercritical $CO_2$ in good yield and high purity over a long service life, which may be several weeks or months up to approximately 3–5 years.

FIG. 2 illustrates how the method of the present invention may be incorporated into a typical manufacturing process in which the purified fluid carbon dioxide is used for cleaning of high purity products. Carbon dioxide is produced at 70 by conventional methods. Operation 70 generally occurs at a gas manufacturer's facility, and the carbon dioxide gas is then transported to the user's facility under high pressure in cylinders 72 or tube trailers 74. This system can be modified by passing the produced gaseous carbon dioxide through a system 76 of the present invention, but which is designed for only partial decontamination, before it is loaded into the cylinders 72 or tube trailers 74 for shipment to the customers. It will be understood that the volume of gas being transferred to the cylinders or trailers by the manufacturer is usually such that it is usually not economically justified to try to reduce the contaminant level down to the final 100 ppb or lower for delivery to the manufacturer's facility. Normally some contaminants, such as water or hydrocarbons, are likely to reenter the gaseous carbon dioxide as it is being connected to the customer's gas supply system. Also, decontamination to the final level for such a large volume of gaseous carbon dioxide will take longer than is justified when filling large a numbers of cylinders 72 or trailers 74. However, the value of usage of the system of this invention is that the cylinders 72 or tube trailers 74 of gaseous carbon dioxide then arrive at the ultimate manufacturers' facilities with a greatly reduced contaminant content, such that they can be attached to the system feed line 78 and passed to conversion of the carbon dioxide to its liquid or supercritical state at 80, and then on to the decontamination unit 82 of the present invention for the final reduction to the contaminant content needed for use in the manufacturer's production process 84. If desired, an intermediate partial decontamination step 86 may be used, especially if the gaseous carbon dioxide in cylinders 72 or trailers 74 has not had a prior partial decontamination in unit 76. Partial decontamination 86 may thus be an alternative to partial decontamination 76, to reduce the amount of contaminants which must be removed in the principal decontamination unit 82. It may also be advantageous to include a solids removal unit 88 upstream of decontamination unit 82, and also preferably upstream of supercriticality conversion unit 80, to eliminate any particulate matter which has entered from a cylinder 72 or tube trailer 74 (or some other source). Such solids removal units are conventional.

The contaminated fluid carbon dioxide for decontamination in the unit 82 of this invention may come as new material through line 110 from the intake system described above. Alternatively, the contaminated fluid carbon dioxide may also be passed to decontamination unit 82 as a recycle stream 112 under liquid phase or supercriticality conditions from the manufacturing process 84. Since the carbon dioxide is not chemically reacted in the manufacturing process 84, it can if desired be recycled for removal of contaminants accumulated in the manufacturing process, thus saving the cost of producing new fluid $CO_2$ for use as a cleaner in the manufacturing process 84. Thus it will be seen that the decontamination method 82 of the present invention can be used to prepare fresh fluid carbon dioxide for use as a manufacturing cleaner or to recover and clean recycled fluid $CO_2$ for reuse.

Figure 7:
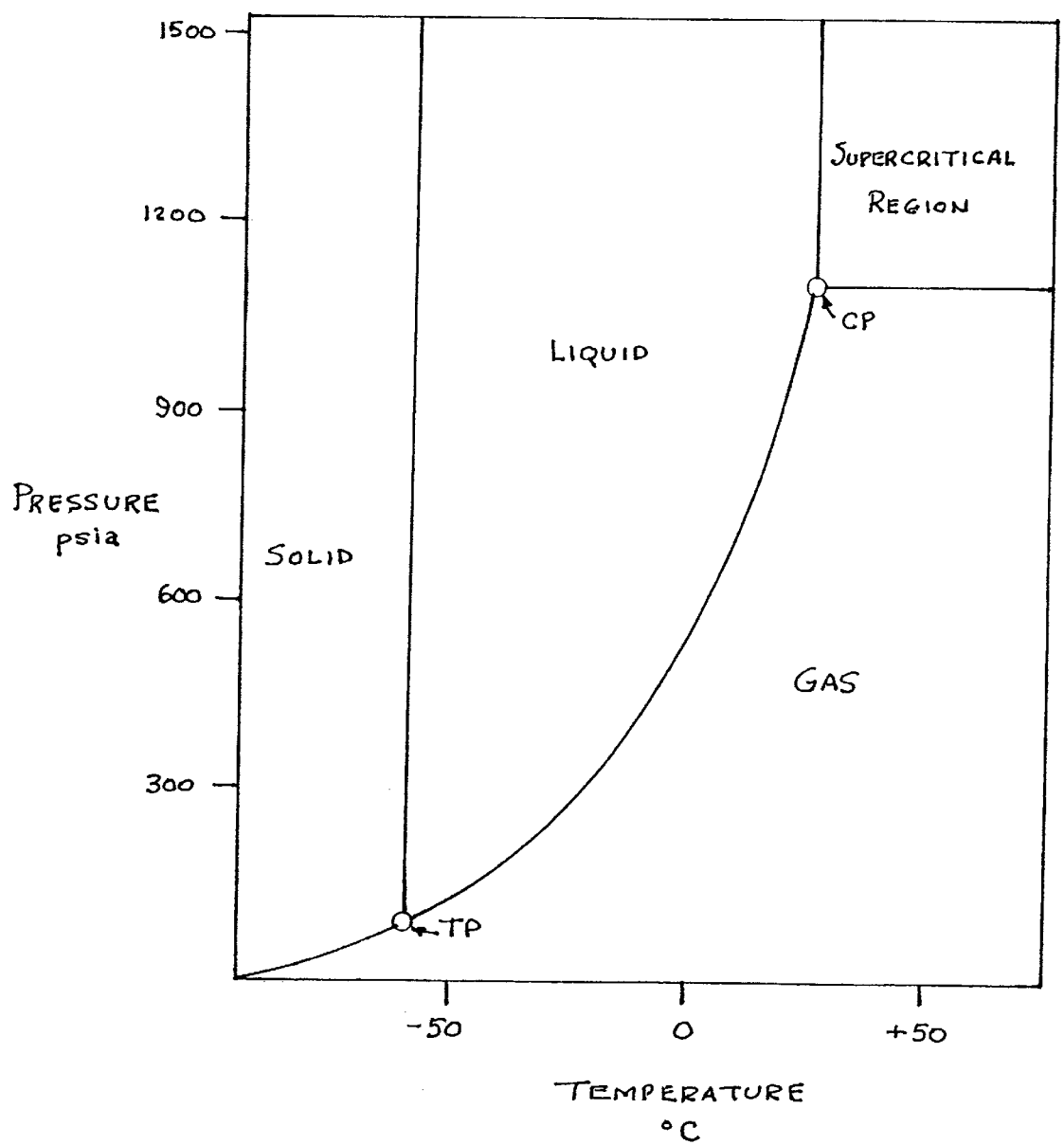
FIG. 7 is a generalized temperature/pressure (T/P) phase diagram for carbon dioxide.[1]

The reaction vessels A and B will be constructed to retain the high purity mordenite or other zeolite by means which are not degraded by the operating conditions. Typically the vessels and their internal zeolite retention components will be made of stainless steel or other metal which is resistant to operating conditions. A large number of materials may be used, since as may be observed from FIG. 7, high temperature is not a factor. The interior structure of a vessel for retaining the zeolite bed within can be of any conventional structure used for reaction vessels as long as the resistance to the conditions of temperature and pressure is maintained. Those skilled in the art will be aware of such structures and therefore those do not need to be detailed further here.

Figure 3:
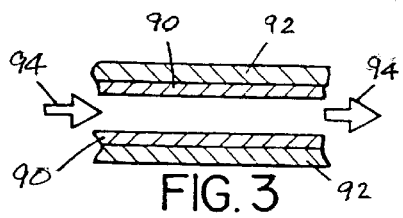
FIG. 3 is a schematic sectional view illustrating coating of high silica zeolite on a high surface area substrate and use of the coated substrate in the process of this invention to decontaminate the supercritical carbon dioxide as it passes over and contacts the zeolite coating.
Figure 4:
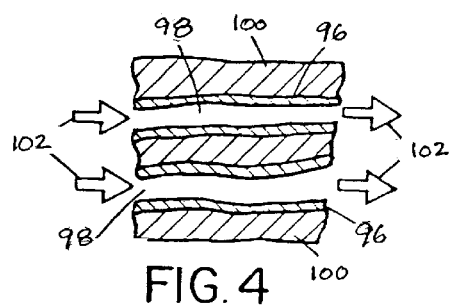
FIG. 4 is a schematic sectional view illustrating a porous substrate which has coated on the interior walls of its pores the high silica zeolite, which contacts the fluid carbon dioxide as it passes through the substrate and contacts the zeolite coating.
Figure 5:
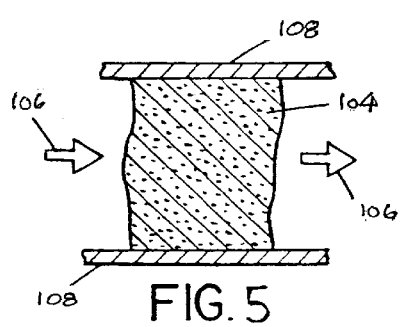
FIG. 5 is a schematic sectional view illustrating a porous body of zeolite in which the contaminated fluid carbon dioxide contacts the zeolite and is decontaminated as its passes through the zeolite body.

The high silica zeolites can be used in a variety of different configurations (all of which for brevity herein are referred to as "beds"). For instance, as shown in FIG. 3, the high silica mordenite can be in the form of one or more sheets 90, alone or coated on a substrate 92, over and/or between which the supercritical fluid (indicated by the arrows 94) is flowed. Typically the inlet supercritical carbon dioxide will have hydrocarbon and other contaminant contents in the range of about 1–2 ppm, and the outlet, decontaminated supercritical carbon dioxide will have contaminant contents no greater than about 100 ppb, and preferably no greater than 10–50 ppb, and most preferably no greater than about 1 ppb. Alternatively, as illustrated in FIG. 4, the high silica mordenite can also be used as a thin coating 96 in the pores 98 of a porous ceramic or other inert solid 100 over which flows the fluid $CO_2$ fluid to be decontaminated, as indicated by the arrows 102. In yet another alternative, as illustrated in FIG. 5, one can simply pass the gas through a body 104 consisting substantially or essentially of the high silica mordenite, either in a block form or as a body of granules (constrained by some type of conventional containment structure 108 which is part of the vessel interior), in order to take advantage of the porous zeolite structure (a particularly preferred embodiment of the high silica zeolite has a pore size in the range of 5 Å–20 Å), with such passage indicated by the arrows 106. The high silica mordenite body can also be in the form of a body of comminuted fine powders. However, using such powders will cause a significant pressure drop in the supercritical carbon dioxide fluid stream, so it is preferred to used a powdered form of the zeolite only in high gas pressure systems. It is thus possible to have different forms of the high silica zeolite materials for fluid streams of different pressures, by using different particle sizes.

In the present invention one will normally be dealing with supercritical $CO_2$ fluid flow rates in the range of about 1–8000 standard liters of fluid per minute (slm) and desired system service lifetimes in the range of up to 36–60 months or more. Operating temperature and pressure will be greater than the critical point temperature and pressure of carbon dioxide for supercritical $CO_2$, which as noted above are 31.3° C. (88.3° F.) and 74 bar (1070 psi) respectively. For the liquid phase $CO_2$ the temperatures and pressures will be within the indicated "liquid" region in FIG. 7, which is delineated as stated above. Preferably the temperature and pressure will be maintained substantially above the critical point values, to insure that fluctuations in temperature or pressure during system operation will not drop either temperature or pressure out of the criticality region and cause a phase transition in the carbondioxide. Typically temperature ranges will be 31°–60° C. (88–140° F.) and pressure ranges will be 74–250 bar (1070–3625 psi) for supercritical $CO_2$ and temperature ranges will be −50°–25° C. (−46°–77° F.) and pressure ranges will be 7–140 (100–2000 psi) for liquid $CO_2$.

It will be recognized that while the invention has been characterized in terms of use with liquid and supercritical carbon dioxide for precision cleaning of semiconductor and other electronic substrate products, it will be of similar value with respect to treatment of fluid carbon dioxide for cleaning of any other type of high purity product. This could include, for instance, use in manufacture of prosthetic devices for implant in humans or animals, production of high purity substrates or other types of materials for research purposes, production of optical fibers and optoelectronic devices (including lasers), pharmaceutical manufacture, and production of high purity materials that are to be used in extreme environments such as products for use in spacecraft or artificial satellites. It will also be useful in other applications of use of fluid carbon dioxide, even where slightly higher contaminant levels in the products can be tolerated, such as in some solvent extraction processes where the product is intended to undergo additional reactions or treatments subsequently. In addition, it will find use for purification of $CO_2$ to be used in the beverage industry, where $CO_2$ is injected into beverages such as soda water, pop, beer, quinine water, and the like.

It will be evident from the above that there are numerous embodiments of this invention which, while not expressly stated above, are clearly within the scope and spirit of the invention. The above description is therefore intended to be exemplary only, and the actual scope of the invention is to be defined solely by the appended claims.

We claim:

1. A method of removing contaminants from a stream of liquid or supercritical fluid carbon dioxide which comprises contacting said stream with a quantity of high silica zeolite, said high silica zeolite having a silica:alumina ratio of at least 20:1, for a period of time sufficient to reduce the contaminant content of said stream to not more than 100 ppb.

2. A method as in claim 1 wherein said contaminant content of said fluid stream is reduced to not more than 10–50 ppb.

3. A method as in claim 1 wherein said contaminant content of said fluid stream is reduced to not more than about 1 ppb.

4. A method as in claim 1 wherein said fluid carbon dioxide comprises liquid carbon dioxide.

5. A method as in claim 4 wherein said high silica zeolite comprises a zeolitic structure and a silica:alumina ratio of at least 90:1.

6. A method as in claim 5 wherein said high silica zeolite comprises a zeolitic structure and a silica:alumina ratio of at least 300:1.

7. A method as in claim 6 wherein said high silica zeolite comprises a zeolitic structure and a silica:alumina ratio in the range of 500–2000:1.

8. A method as in claim 1 wherein said fluid carbon dioxide comprises supercritical carbon dioxide.

9. A method as in claim 8 wherein said high silica zeolite comprises a zeolitic structure and a silica:alumina ratio of at least 90:1.

10. A method as in claim 9 wherein said high silica zeolite comprises a zeolitic structure and a silica:alumina ratio of at least 300:1.

11. A method as in claim 10 wherein said high silica zeolite comprises a zeolitic structure and a silica:alumina ratio in the range of 500–2000:1.

12. A method as in claim 1 wherein said high silica zeolite comprises a high silica mordenite, ZSM-5 or a high silica Y-type zeolite.

13. A method as in claim 1 wherein said high silica zeolite is formed by reducing the alumina content of a natural or synthetic zeolite.

14. A method as in claim 1 wherein said high silica zeolite is activated prior to contact with said fluid carbon dioxide.

15. A method as in claim 14 wherein said activation comprises heating said high silica zeolite to a temperature on the order of about 150°–425° C. for a period for about 24–72 hours.

16. A method as in claim 1 further comprising said high silica Zeolite being disposed in at least two separate quantities within a corresponding number of vessels, said vessels being interconnected such that contaminated fluid carbon dioxide may be directed to one vessel of said vessels for decontamination, with a portion of decontaminated fluid carbon dioxide exiting from said first vessel being passed to another vessel of said vessels and used to remove accumulated fluid carbon dioxide contaminants from zeolite within said another vessel such that said zeolite within said another vessel may subsequently be used to decontaminate additional contaminated fluid carbon dioxide.

17. A method as in claim 16 further comprising upon cessation of decontamination in said one vessel and of removal of contaminates from said zeolite in said another vessel, directing contaminated fluid carbon dioxide to said another vessel and passing a portion of the purified fluid carbon dioxide product therefrom to said one vessel to remove accumulated contaminants from zeolite therein.

18. A method as in claim 16 wherein removal of accumulated contaminants from zeolite in said another vessel which is not operating to decontaminate contaminated fluid carbon dioxide requires less time than the operating run time of said one vessel which is operating to decontaminate fluid carbon dioxide, such that said another vessel becomes ready to resume decontamination operation prior to the termination of the operating run of said one vessel, whereby upon said termination of the operating run of said one vessel, input of contaminated fluid carbon dioxide can be diverted from said one vessel to said another vessel for decontamination with no significant interruption of decontamination.

19. A method as in claim 18 wherein diversion of said contaminated fluid carbon dioxide from said one vessel to said another vessel is followed promptly by passage of a portion of outlet purified fluid carbon dioxide from said another vessel to said one vessel to accomplish removal of accumulated contaminants from zeolite in said one vessel in preparation for subsequent reuse of said one vessel for decontamination of contaminated fluid carbon dioxide.

20. A method as in claim 16 further comprising disposing a sensor in an exit gas stream from said another vessel undergoing removal of accumulated contaminants for measurement of contaminants entrained in said exit gas stream, determining from said measurement when said contaminants in said another vessel have been removed to an acceptable residual content, and thereafter diverting said contaminated fluid carbon dioxide from said one vessel to said another vessel for decontamination.

21. A method as in claim 20 further comprising using control means responsive to said sensor for alternating diversion of said contaminated fluid carbon dioxide for decontamination between said one and said another vessels upon determination from said sensor that completion of removal of accumulated contaminants from that vessel not then conducting decontamination has occurred.

22. A method as in claim 21 further comprising timing means within said control means for delaying said diversion for a period of time following said completion of removal of contaminants, said period of time being the anticipated differential time between said completion of removal of contaminants of that vessel and productive decontamination operating run time of the alternate vessel.

23. A method as in claim 21 wherein said control means comprises a microprocessor and associated operating software.

24. A method as in claim 16 wherein said high silica zeolite comprises a zeolitic structure and a silica:alumina ratio in the range of 500–2000:1.

25. A method as in claim 16 wherein said fluid carbon dioxide comprises liquid carbon dioxide.

26. A method as in claim 25 wherein said high silica zeolite comprises a zeolitic structure and a silica:alumina ratio of at least 90:1.

27. A method as in claim 26 wherein said high silica zeolite comprises a zeolitic structure and a silica:alumina ratio of at least 300:1.

28. A method as in claim 27 wherein said high silica zeolite comprises a zeolitic structure and a silica:alumina ratio in the range of 500–2000:1.

29. A method as in claim 16 wherein said fluid carbon dioxide comprises supercritical carbon dioxide.

30. A method as in claim 29 wherein said high silica zeolite comprises a zeolitic structure and a silica:alumina ratio of at least 90:1.

31. A method as in claim 30 wherein said high silica zeolite comprises a zeolitic structure and a silica:alumina ratio of at least 300:1.

32. A method as in claim 31 wherein said high silica zeolite comprises a zeolitic structure and a silica:alumina ratio in the range of 500–2000:1.

* * * * *